US00RE39446E

(19) United States
(12) Reissued Patent
Winch et al.

(10) Patent Number: US RE39,446 E
(45) Date of Reissued Patent: Dec. 26, 2006

(54) POWER FILTER CIRCUIT RESPONSIVE TO SUPPLY SYSTEM FAULT CONDITIONS

(75) Inventors: Peter G. Winch, Raleigh, NC (US); Richard Billingsley, Rossland (CA)

(73) Assignee: Electronic Systems Protection, Inc., Zebulon, NC (US)

(21) Appl. No.: 10/102,140

(22) Filed: Mar. 21, 2002

(Under 37 CFR 1.47)

Related U.S. Patent Documents

Reissue of:
(64) Patent No.: 6,040,969
Issued: Mar. 21, 2000
Appl. No.: 09/128,435
Filed: Aug. 4, 1998

(51) Int. Cl.
*H02H 3/18* (2006.01)

(52) U.S. Cl. ..... 361/82; 361/42; 361/84; 307/138; 307/137; 307/127

(58) Field of Classification Search ..... 361/42, 361/54, 56–58, 82, 84, 86, 111; 307/122–127, 307/104, 138, 137, 140; 340/635, 653, 649, 340/650, 654
See application file for complete search history.

(56) References Cited

U.S. PATENT DOCUMENTS 3,048,718 A 8/1962 Starzec et al.
3,273,039 A * 9/1966 Godshalk et al. ..... 320/165
3,407,335 A 10/1968 Hartung
3,475,653 A 10/1969 Odenberg et al.
3,571,608 A 3/1971 Hurd
3,579,036 A 5/1971 McCoy
3,800,198 A 3/1974 Graf et al.
4,068,276 A * 1/1978 Pintell ..... 361/46
4,347,475 A 8/1982 Ullin
4,368,499 A 1/1983 Stifter
4,598,331 A * 7/1986 Legatti ..... 361/46
4,644,437 A 2/1987 Robe
4,723,191 A 2/1988 Menniti
4,879,625 A 11/1989 Potenzone
4,891,728 A 1/1990 Preis et al.
4,912,589 A * 3/1990 Stolarczyk
4,943,886 A * 7/1990 Quazi
4,999,728 A 3/1991 Curl (Continued)

OTHER PUBLICATIONS

U.S. Appl. No. 60/048,333, filed May 30, 1997, Goldstein.

*Primary Examiner*—Kim Huynh
(74) *Attorney, Agent, or Firm*—Edell, Shapiro & Finnan, LLC

(57) ABSTRACT

A power filter circuit for protecting electronic equipment from electromagnetic interference introduced by a supply system circuit includes a fault/condition sensing circuit capable of detecting whether the supply system circuit is properly wired. The sensing circuit controls switching circuits in accordance with the determination of whether the supply system is properly wired. The sensing circuit activates a first switching circuit to form a short circuit between the neutral and ground conductors of the power filter circuit when it is determined that the supply system circuit is properly wired. If any wiring fault conditions, including a reverse polarity wiring, is detected by the sensing circuit, the first switch is not activated and the short circuit is not formed between the neutral and ground conductors. The sensing circuit controls a second switching circuit which corrects the polarity when a reverse polarity condition is detected and which does not change the polarity when a correct polarity condition is detected. The sensing circuit can be used with the first and second switching circuits in combination. In this case, the first switching circuit can form a short circuit between the line conductor of the power filter circuit and the ground conductor when a reverse polarity condition is detected to provide superior common mode electromagnetic interference suppression.

42 Claims, 9 Drawing Sheets

U.S. PATENT DOCUMENTS 5,105,325 A * 4/1992 Lawrence
5,105,327 A * 4/1992 Wohlforth
5,136,455 A * 8/1992 Billingsley
5,153,806 A * 10/1992 Corey
5,179,490 A * 1/1993 Lawrence ..... 361/42
5,327,319 A * 7/1994 Lee et al.
5,388,021 A * 2/1995 Stahl
5,392,188 A * 2/1995 Epstein
5,398,150 A * 3/1995 Standler
5,412,526 A * 5/1995 Kapp et al.
5,426,552 A * 6/1995 Avitan
5,448,443 A * 9/1995 Muelleman
5,465,188 A 11/1995 Pryor et al.
5,483,406 A 1/1996 Bennett
5,485,339 A * 1/1996 Dufresne
5,513,060 A 4/1996 Bremond
5,555,150 A * 9/1996 Newman, Jr.
5,610,793 A * 3/1997 Luu
5,625,521 A * 4/1997 Luu
5,631,797 A 5/1997 Chabinec et al.
5,666,255 A * 9/1997 Muelleman
5,689,180 A * 11/1997 Carlson
5,695,886 A 12/1997 Dewan
5,721,661 A * 2/1998 Mechanic
5,789,902 A 8/1998 Abe et al.
5,828,140 A 10/1998 Shih
5,946,270 A 8/1999 Jang
5,986,861 A 11/1999 Pontarollo
6,008,627 A 12/1999 Narita
6,072,682 A 6/2000 Raveanelli et al.
6,118,639 A 9/2000 Goldstein
6,133,645 A 10/2000 Scribner et al.

* cited by examiner

POWER FILTER CIRCUIT RESPONSIVE TO SUPPLY SYSTEM FAULT CONDITIONS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a power filter circuit for protecting electronic equipment from supply system electromagnetic interference, and, more particularly, to sensing circuits capable of determining whether the supply system is properly wired and has a correct or reverse voltage polarity, and switching circuits which connect neutral and ground conductors of the power filter circuit, correct the voltage polarity, or disconnect a load from the supply system in response to the sensing circuit.

2. Description of the Related Art

With the proliferation of highly sensitive electronic and microprocessor-based equipment, it is increasingly important to have filtering devices which protect such equipment from disruptive or damaging supply system current and voltage anomalies at a reasonable cost. Such anomalies, broadly referred to as electromagnetic interference (EMI), include continuous or repetitive interference, such as radio frequency interference (RFI) and power line harmonics, and transient interference, such as short duration, overvoltage conditions. To receive power, sensitive electronic equipment is generally connected to an AC supply system via a line conductor which carries an AC line voltage of 120 volts rms (Vrms), a neutral conductor, and a ground conductor. The energy propagation paths through these conductors are conventionally characterized as "normal mode" (i.e., line-to-neutral) and "common mode" (i.e., line-to-ground or neutral-to-ground), and interference occurring over these paths can be characterized as normal mode interference and common mode interference, respectively.

Prior art power filters have employed passive inductive, capacitive and resistive components to address normal mode and common mode RFI and have employed nonlinear devices, such as varistors, gas arresters and silicon avalanche diodes, which conduct only in response to overvoltage conditions to divert overvoltages from sensitive equipment. In general, it has been found that the use of larger capacitor elements between the filter circuit conductors improves low-frequency RFI suppression.

For safety reasons, regulatory bodies such as Underwriters Laboratories, Inc. (UL), have placed a 0.5 mA limit on the steady-state current (leakage current) that a device can conduct to the supply system ground conductor. Consequently, in power filters, common mode circuitry must have a high enough impedance to restrict the flow of leakage current to ground, and this requirement sets a limit on the capacitance of interference-filtering capacitors connected between line and ground and neutral and ground, which in turn limits the filtering of low-frequency common mode interference. While RFI interference on the order of approximately 30 kHz and higher can be filtered by capacitors which meet UL leakage current requirements, equipment can malfunction from interference, such as power line harmonics, at much lower frequencies. In recent years, power line harmonics have come to be recognized as a severe problem due to the proliferation of switch-mode power supplies in all environments and variable-speed drives for motors in industrial environments. Such power line harmonics are generally not significantly attenuated by capacitors which meet UL common mode leakage current requirements.

Since there are different circuit design considerations applicable to suppression of normal mode interference and common mode interference, such as the above-described safety requirements, it is helpful to know whether the AC line voltage is being received with the correct polarity (little or no steady-state voltage across the neutral and ground conductors) or the reverse polarity (little or no steady-state voltage across the line and ground conductors). To this end, modem electrical outlets as well as the plugs of power-sensitive devices are typically configured to mate in only the correct polarity, such that the line and neutral terminals of the 120 Vrms supply system can be connected only to the line and neutral leads of the filtering circuitry, respectively. However, it is not uncommon for the polarity of the power supplied by an AC power network to be the reverse of the indicated polarity, with 120 Vrms being supplied at the neutral terminal of the power outlet instead of the line terminal of the power outlet. Under reverse polarity conditions, the line-to-ground and neutral-to-ground common mode paths are effectively reversed, which, if not properly accounted for in the design of the power filter circuit, creates a risk of excessive leakage current or inadequate EMI protection. Consequently, polarity checking devices that alert the user to a reverse polarity condition in the supply system have been employed in power filter circuits. However, such devices do not automatically correct the reverse polarity condition. Thus, more complicated or expensive power filter circuit designs are typically required to account for the possibility of a reverse polarity condition.

For example, most prior art power filtering circuits generally use an impedance network relying largely on capacitors to suppress common mode interference. Because of the possibility of having 120 Vrms between any two conductors, these devices must use relatively small capacitors between all of the conductors, including the neutral and ground conductors, to meet UL leakage current requirements. Further, these power filter circuits conventionally include clamping devices, such as varistors, connected between each pair of conductors (e.g., in parallel with the capacitors). Below their rated voltage, these clamping devices are non-conductive, thereby presenting an open circuit. Above their rated voltage, these clamping devices conduct, thereby creating a short circuit designed to prevent transients above the rated voltage from reaching the connected electronic equipment. Once again, however, because of the of the possibility of having 120 Vrms between any two conductors, all of the clamping devices, including the clamping device connected between the neutral and ground conductors, must be rated for more than 120 Vrms. This results in an arrangement that can, at best, suppress neutral-to-ground disturbances to about 200 V and, when subjected to the high transient energy levels that often occur on the 120 Vrms supply system, may allow up to 500 V or more to reach connected equipment. For sensitive equipment, this often leads to disruption or damage. Thus, because of the risk of a reverse polarity condition, these devices provide relatively poor common mode suppression of low frequency interference between the neutral and ground conductors and relatively poor common mode suppression of transients between the neutral and ground conductors.

Some manufactures have utilized large inductors (e.g., balun inductors) or isolation transformers to reduce low frequency common mode interference, but these elements are bulky and expensive and are thus typically employed only in highly critical applications.

Another well known approach to achieving acceptable suppression while meeting safety requirements is to incorporate a switching circuit that allows a lower impedance common mode circuit to be used without excessive leakage current. More specifically, it is known to employ a relay-controlled switch to connect an RFI-suppressing capacitor between the neutral conductor and the ground conductor when the AC line voltage (120 Vrms) is detected on the line conductor. If the line voltage is erroneously supplied on the neutral conductor, the relay-controlled switch remains open, and the capacitor is not connected between the neutral and ground connectors, thereby avoiding significant leakage current between the "hot" neutral conductor to the ground conductor. However, if only the capacitor is connected via the switch, the clamping device permanently connected between the neutral conductor and the ground conductor must still be rated for at least 120 Vrms, since its remains connected even under reverse polarity conditions. Thus, including only the capacitor (and not the clamping device) in the switching arrangement results in no improvement in neutral-to-ground common mode transient suppression.

A slight improvement of the conventional switching circuit approach is disclosed in U.S. Pat. No. 5,721,661, incorporated herein by reference in its entirety. In the circuit described therein, the clamping device is connected in parallel with the capacitor between the ground conductor and the switch contact rather than between the ground conductor and the neutral conductor (i.e., the clamping device is switched along with the capacitor instead of being permanently connected). This arrangement allows the clamping circuit to have a lower voltage rating, since it is connected between the ground and neutral conductors only when it has been determined that the AC line voltage is not being carried on the neutral conductor. Further, the capacitor employed in the circuit disclosed in U.S. Pat. No. 5,721,661 has a capacitance of 2.2 micro farads, which purportedly provides RFI suppression superior to that provided by smaller capacitors.

As described in U.S. Pat. No. 5,721,661 and as evidenced by the device disclosed therein, attempts have been made over a long period of time to address the problem of meeting leakage current requirements while attaining better common mode EMI performance at a reasonable cost. However, the power filter circuit disclosed in U.S. Pat. No. 5,721,661 still requires the parallel arrangement of a clamping device and a capacitor between the switch contact of the relay-controlled switch and the ground conductor, and these circuit elements contribute to the cost of the device. Further, while this power filter circuit provides some degree of common mode RFI suppression, the circuit's ability to suppress low frequency interference, such as power line harmonics, is limited, and the circuit is incapable of suppressing common mode transients below 20 volts.

Moreover, certain types of equipment are sensitive to neutral-to-ground voltages; thus, the potential difference across the neutral and ground conductors is often regarded in the industry as a significant measure of circuit performance, with a minimal potential difference being desirable. Unlike more expensive, transformer-based power filter circuits, the presence of the capacitor connected between the neutral and ground conductors in the power filter circuit disclosed in U.S. Pat. No. 5,721,661 results in an undesirable steady-state potential difference between the neutral and ground conductors.

Consequently, there remains a need for an inexpensive power filter circuit which meets UL current leakage requirements under reverse polarity conditions while providing acceptable protection to connected equipment from supply system electromagnetic interference.

SUMMARY OF THE INVENTION

It is an object of the present invention to provide optimum levels of common mode electromagnetic interference suppression, unattainable by economical prior art devices, so that connected equipment can operate without damage or disruption.

It is another object of the present invention to provide improved suppression of common mode transients by diverting common mode transients of any voltage level from connected equipment.

It is yet another object of the present invention to provide improved attenuation of all continuous or repetitive common mode interference, including RFI and lower frequency disturbances such as power line harmonics.

It is a further object of the present invention to reduce circuit complexity and costs by reducing the number of circuit elements required to suppress electromagnetic interference.

It is yet a further object of the present invention to detect the incorrect wiring of a supply system circuit, including a reverse polarity line-neutral voltage condition.

Another object of the present invention is to provide, in response to a determination that the supply system circuit is correctly wired, optimal common mode EMI protection between neutral and ground with no voltage differential therebetween.

Yet another object of the present invention is to detect and correct reverse polarity conditions to eliminate the risk of receiving the AC line voltage on the neutral conductor.

Another object of the present invention is to protect connected equipment by preventing supply system overvoltages from reaching the connected equipment.

The aforesaid objects are achieved individually and in combination, and it is not intended that the present invention be construed as requiring two or more of the objects to be combined unless expressly required by the claims attached hereto.

To achieve the above objectives, the present invention comprises a power filter circuit connected between an AC supply system circuit and equipment to be protected from EMI introduced by the supply system circuit. The power filter circuit includes at least one wiring fault condition sensing circuit capable of detecting a properly wired supply system circuit or a supply circuit wired with a reverse polarity. The sensing circuit(s) controls at least one switching circuit in accordance with the determination of whether the supply system is properly wired and/or has a correct or reverse polarity.

According to one embodiment of the present invention, the normal polarity sensing circuit activates a switching circuit to form a short circuit between the neutral and ground conductors of the power filter circuit when it is determined that the supply system circuit is properly wired and activates an indicator which indicates that the supply system circuit is correctly wired. In this embodiment, the switching circuit can include a single pole, single throw (SPST) relay which, when energized, closes first and second contacts that are respectively connected directly to the neutral and ground conductors.

If any single or combination of wiring fault conditions is detected (including a reverse polarity wiring) by the normal polarity sensing circuit, energy is not supplied to the relay coil of the switching circuit, and the short circuit is not formed between the neutral and ground conductors. In particular, by not shorting the neutral and ground conductors when a reverse polarity condition exists, excessive leakage current is not channeled to the ground conductor.

The power filter circuit according to the first embodiment of the present invention meets UL current leakage requirements while providing superior common mode EMI suppression performance to minimize the risk of damage or disruption to sensitive electronic equipment. Unlike prior art power filter circuits employing clamping devices which do not suppress transients below their rated voltage, according to the circuit of the present invention, the short circuit formed between the neutral and ground conductors shorts all transients on the neutral conductor to the ground conductor, irrespective of the level of the transient voltage, i.e., down to zero volts, thereby providing better common mode transient suppression. Further, unlike prior art power filtering circuits which cannot adequately suppress power line harmonics due to the limited low-frequency filtering of a capacitor connected between the neutral and ground conductors, according to the present invention, all common mode interference appearing on the neutral conductor, including power line harmonics, is suppressed via the short circuit formed between the neutral and ground conductors.

Furthermore, in contrast to prior art power filter circuits having a capacitor connected between the neutral and ground conductors, the circuit of the present invention has a steady-state voltage of zero between the neutral and ground conductors, thereby providing superior protection to equipment sensitive to neutral-ground voltage differences.

Moreover, the power filter circuit of the present invention does not include any clamping device or capacitor circuit element connectable between the neutral and ground conductors, thereby reducing costs in comparison to prior art power filter circuits requiring such devices.

In accordance with another embodiment of the present invention, a reverse polarity sensing circuit controls a switching circuit which corrects the polarity of an AC power signal when a reverse polarity condition is detected and which pass the correct polarity when a correct polarity condition is present. Unlike the aforementioned normal polarity sensing circuit, the reverse polarity sensing circuit activates a switching circuit only when a reverse polarity condition is detected. In this embodiment, the switching circuit can include a double pole, double throw (DPDT) relay which, under conditions of normal polarity of the supply system circuit, is not energized by the reverse polarity sensing circuit such that the input line and neutral conductors remain connected to the output line and neutral conductors, respectively, thereby passing the correct polarity to the connected equipment. Under conditions of reverse polarity of the supply system circuit, the DPDT relay is energized by the sensing circuit, causing the switching circuit to connect the input line and neutral conductors to the output neutral and line conductors, respectively, thereby correcting the polarity of the power supplied to the equipment.

According to another embodiment of the present invention, a double pole, single throw (DPST) relay is used with the normal polarity sensing circuit to prevent power from reaching the connected equipment when the supply system in not correctly wired. Further, an overvoltage protection circuit can be connected to the normal polarity sensing circuit to disconnect the connected equipment when an overvoltage condition is detected.

Various combinations of the sensing circuits, switching circuits and overvoltage protection circuit of the present invention can be incorporated into a power filter system to provide reverse polarity detection and/or correction in conjunction with superior common mode interference suppression with minimal leakage current.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
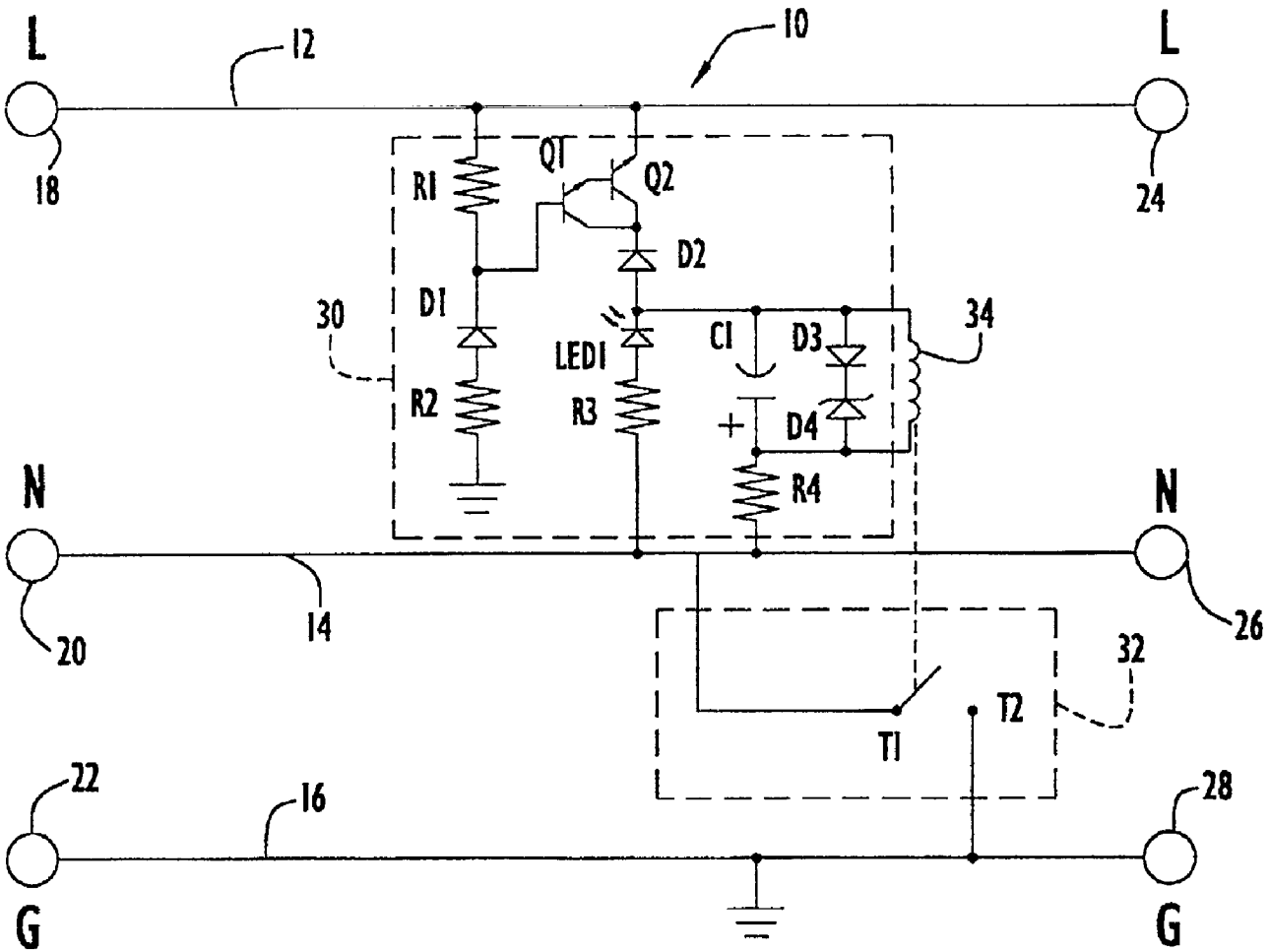
FIG. 1 is a schematic illustration of a power filter circuit according to a first embodiment of the present invention.

FIG. 1 is a schematic diagram of a power filter circuit 10 in accordance with a first embodiment of the present invention. Circuit 10 includes a line conductor 12, a neutral conductor 14, and a ground conductor 16. At one end, the line, neutral and ground conductors 12, 14 and 16 have corresponding input terminals 18, 20 and 22 that are respectively connectable, via a cord and male plug or other conventional mechanisms, to mating terminals (e.g., a wall outlet) of the line, neutral and ground connectors of an AC supply system, such as a single phase 120 Vrms supply circuit. Of course, the invention is not limited to operation with any particular AC supply system, and the invention is considered to include embodiments suitable for operation with any type of AC supply system, including those using different voltages and frequencies.

At the other end, the line neutral and ground conductors 12, 14 and 16 have respective output terminals 24, 26 and 28 that are connectable, via a cord and female plug or other conventional mechanisms, to a load, such as a computer, a photocopier or other electrical or electronic equipment.

Circuit 10 further includes a normal polarity, fault condition sensing circuit 30 and a switching circuit 32 controlled by sensing circuit 30. As explained in greater detail below, normal polarity, fault condition sensing circuit 30 senses whether the supply system circuit is properly connected with the correct line-neutral polarity, and, if so, provides a direct connection between neutral conductor 14 and ground conductor 16 via closure of switching circuit 32. If any supply system fault condition is detected, such as the line-neutral polarity of the supply system being reversed or any of the three connectors of the supply system being improperly wired or connected, sensing circuit 30 and switching circuit 32 operate to disconnect neutral conductor 14 from ground conductor 16.

As shown in FIG. 1, normal polarity fault condition sensing circuit 30 includes a first resistor R1, a diode D1 and a second resistor R2 connected in series between line conductor 12 and ground conductor 16. A first bipolar transistor Q1 has a base connected between resistor R1 and diode D1, an emitter connected to the base of a second bipolar transistor Q2 and a collector connected to the collector of transistor Q2. The emitter of transistor Q2 is connected to line conductor 12, such that transistors Q1 and Q2 form a Darlington pair. The emitter-to-collector junction of transistor Q2, a second diode D2, a light emitting diode indicator LED1 and a third resistor R3 are connected in series between line conductor 12 and neutral conductor 14. The emitter-to-collector junction of transistor Q2 and diode D2 are also connected in series with a capacitor C1 and a fourth resistor R4 between line conductor 12 and neutral conductor 14, such that the serial combination of light indicator LED1 and resistor R3 is connected in parallel with the serial combination of capacitor C1 and resistor R4.

Switching circuit 32 comprises a normally open single pole, single throw (SPST) relay with its relay switching coil 34 connected across the terminals of (i.e., in parallel with) capacitor C1. A third diode D3 and a zener diode D4 are connected in series across the relay switching coil 34, i.e, in parallel with coil 34 and also in parallel with capacitor C1 and form a suppressor circuit. One contact T1 of switching circuit 32 is connected directly to neutral conductor 14, while the other contact T2 of switching circuit 32 is connected directly to ground conductor 16.

When each of the line, neutral and ground terminals of the supply system is properly wired and connected, the AC line voltage (120 Vrms) appears between line conductor 12 and neutral conductor 14 of circuit 10 and between line conductor 12 and ground conductor 16, and little or no steady-state voltage appears between neutral conductor 14 and ground conductor 16. Under these conditions, resistors R1 and R2 form a voltage dividing network, and diode D1 operates as rectifier, producing a half-wave rectified voltage across resistor R1. The voltage across resistor R1 is also present across the base of transistor Q1 (connected to the terminal of resistor R1 that is connected to diode D1) and the emitter of transistor Q2 (connected to line conductor 12) and provides the necessary base drive to turn on the Darlington pair formed by transistors Q1 and Q2. That is, the voltage applied to the base of transistor Q1 causes transistor Q1 to conduct, which in turn causes transistor Q2 to conduct. In this state, half-wave rectified current flows from line conductor 12 to neutral conductor 14 through the path formed by the emitter-to-collector junction of transistor Q2, diode D2, light indicator LED1 and resistor R3, thereby energizing light indicator LED1 to produce a visible indication that the supply circuit is correctly wired (i.e., the continuity of all three conductors and and the correct voltage polarity between line and neutral are present).

When the Darlington pair is turned on in the above-described manner, current also flows from line conductor 12 to neutral conductor 14 through the path formed by the emitter-to-collector junction of transistor Q2, diode D2, capacitor C1 and resistor R4, thereby charging capacitor C1 and producing a DC voltage across capacitor C1. By way of non-limiting example, capacitor C1 can be charged to approximately 48 volts DC. When capacitor C1 is charged, it supplies the necessary magnetizing energy to energize relay switching coil 34 of switching circuit 32, thereby closing the switch of switching circuit 32 to connect contacts T1 and T2 and forming a short circuit between neutral conductor 14 and ground conductor 16. That is, when the switch is closed, neutral conductor 14 is directly connected to ground conductor 16 via a conductor without any intervening circuit elements along the conductive path (other than the closed switched).

The series combination of diode D3 and Zener diode D4 across coil 34 suppresses switching transients produced by coil 34. Other circuit elements may be used instead of the diode-Zener diode combination to perform the same function, including, but not limited to: diodes, bidirectional transzorbs or RC snubbers.

Since the base drive current at the base of transistor Q1 flows in a path from line conductor 12 to ground conductor 16, this current represents leakage current which must be minimized. Using a single transistor with a low base current may produce an insufficient collector current to drive both light indicator LED1 and coil 34. According to the present invention, the Darlington pair arrangement of transistors Q1 and Q2 advantageously allows a very small amount of base drive current at the base of transistor Q1 to cause a significant amount of collector current to flow from transistor Q2 in order to energize switching coil 34 and light indicator LED1. Specifically, the small base drive current to transistor Q1 produces an amplified collector current in transistor Q1 that is supplied as the base drive current to the base of transistor Q2. The amplified base current to transistor Q2 is amplified again by transistor Q2 to produce enough collector current to drive both switching circuit 32 and light indicator LED1.

Under reverse polarity supply system conditions, 120 Vrms will appear across line conductor 12 and neutral conductor 14 and across neutral conductor 14 and ground conductor 16. Little or no steady-state voltage will appear across line conductor 12 and ground conductor 16. Without line-to-ground voltage, no base drive is provided to the Darlington pair formed by transistors Q1 and Q2 at the base of transistor Q1, and transistors Q1 and Q2 remain in an off state. In this state, no collector current is available from the Darlington pair; thus, light indicator LED1 is not energized and capacitor C1 is not charged so that no DC energizing voltage is applied to coil 34 of switching circuit 32. Consequently, switching circuit 32 does not connect contacts T1 and T2 and no short circuit is formed between neutral conductor 14 and ground conductor 16. The neutral-to-ground connection is not made under reverse polarity conditions, since a neutral-to-ground short circuit in this instance would short out the supply system circuit, drawing an amount of short circuit current limited only by the impedance of the supply system circuit, which would cause one or more of the supply system circuit breakers to trip. Also, such current would fail to meet the UL requirement of 0.5 mA maximum leakage current to the supply system ground wire.

More generally, sensing circuit 30 provides energy to relay switching coil 34 only when there is supply voltage present across line conductor 12 and ground conductor 16 and across line conductor 12 and neutral conductor 14 as described above. This state occurs only when the supply system circuit has been correctly wired with the correct polarity and integrity of all three conductors. If the polarity is reversed and/or if one or more of the supply system conductors is disconnected, coil 34 of the switching relay will not be energized and contacts T1 and T2 remain separated. Likewise, light indicator LED1 is illuminated only when there are no supply system wiring errors, and remains unilluminated when there is a fault condition in the wiring of any of the three supply system connectors, including a reverse polarity condition. For example, under conditions of correct polarity, but without a properly connected supply system circuit neutral wire, neither DC coil voltage nor half-wave rectified indicator light current is available, leaving coil 34 unenergized and light indicator LED1 off. With correct polarity of the supply system circuit, but without a properly connected supply system circuit line wire, no supply voltage is available in any mode, resulting in an unenergized coil 34 and an unilluminated light indicator LED1. With correct polarity of the supply system circuit, but without a properly connected supply system circuit ground wire, no Darlington pair base drive is available, resulting in an unenergized coil 34 and an unilluminated light indicator LED1.

Thus, according to the first embodiment of the present invention, sensing circuit 30 performs two operations in response to a determination that the supply system circuit is correctly wired. The first operation is to indicate via light indicator LED1 the absence of a wiring fault condition in the supply system circuit. The second operation is to activate switching circuit 32 to form a short circuit between neutral conductor 14 and ground conductor 16.

The power filter circuit according to the first embodiment of the present invention has several advantages over prior art circuits employing capacitors and clamping devices to effect common mode interference suppression. In accordance with the first embodiment, when the correct wiring of the supply system is detected by sensing circuit 30, switching circuit 32 is activated to form a short circuit between neutral conductor 14 and ground conductor 16, irrespective of the voltage between neutral conductor 14 and ground conductor 16. That is, there is no clamping device (e.g., a varistor, a diode, a gas arrester or any other nonlinear element) connected between neutral conductor 14 and ground conductor 16, and there is no capacitor connected between neutral conductor 14 and ground conductor 16. No elements are connected between neutral conductor 14 and ground conductor 16 other than a conductor forming a short circuit, which conductor is formed by the closure of the switch and the direct connection of contacts T1 and T2 to neutral conductor 14 and ground conductor 16, respectively, via conductive wires or the like. The absence of a clamping device and a capacitor in the switching circuit 32 of the present invention results in significantly better performance in several respects.

Unlike prior art power filter circuits employing clamping devices which do not suppress transients below their rated voltage, according to the circuit of the present invention, the short circuit formed between the neutral and ground conductors shorts all transients on the neutral conductor to the ground conductor, irrespective of the level of the transient voltage, i.e, down to zero volts, thereby providing better common mode transient suppression. For example, conventional circuits employing clamping devices permanently connected between neutral and ground must be rated above 120 Vrms and form a short circuit only when high voltage transients are present, thereby allowing lower voltage transients to pass to the connected equipment. Even in the circuit disclosed in U.S. Pat. No. 5,721,661, which connects a lower rated clamping device via a switch only under correct polarity conditions, the clamping device does not activate (i.e., form a short circuit) for transient voltages below 20 volts, thereby allowing lower voltage transients to pass to the connected equipment. Thus, the power filter circuit according to the first embodiment of the present invention provides a common mode transient response superior to that realized in the prior art.

Further, prior art power filtering circuits employ capacitors connected between the neutral and ground conductors to suppress continuous or repetitive common mode interference. While such capacitors may adequately filter high frequency disturbances such as RFI, they cannot adequately suppress lower frequency disturbances, such as power line harmonics, due to the limited low-frequency filtering capabilities of such capacitor (which must have small enough capacitance to limit leakage current to acceptable levels). In contrast to capacitor-based prior art circuits, the circuit of the present invention does not include a capacitor element connected between the neutral and ground conductors, and attenuates all common mode interference appearing on the neutral conductor, including power line harmonics, via the short circuit between the neutral and ground conductors.

Figure 2:
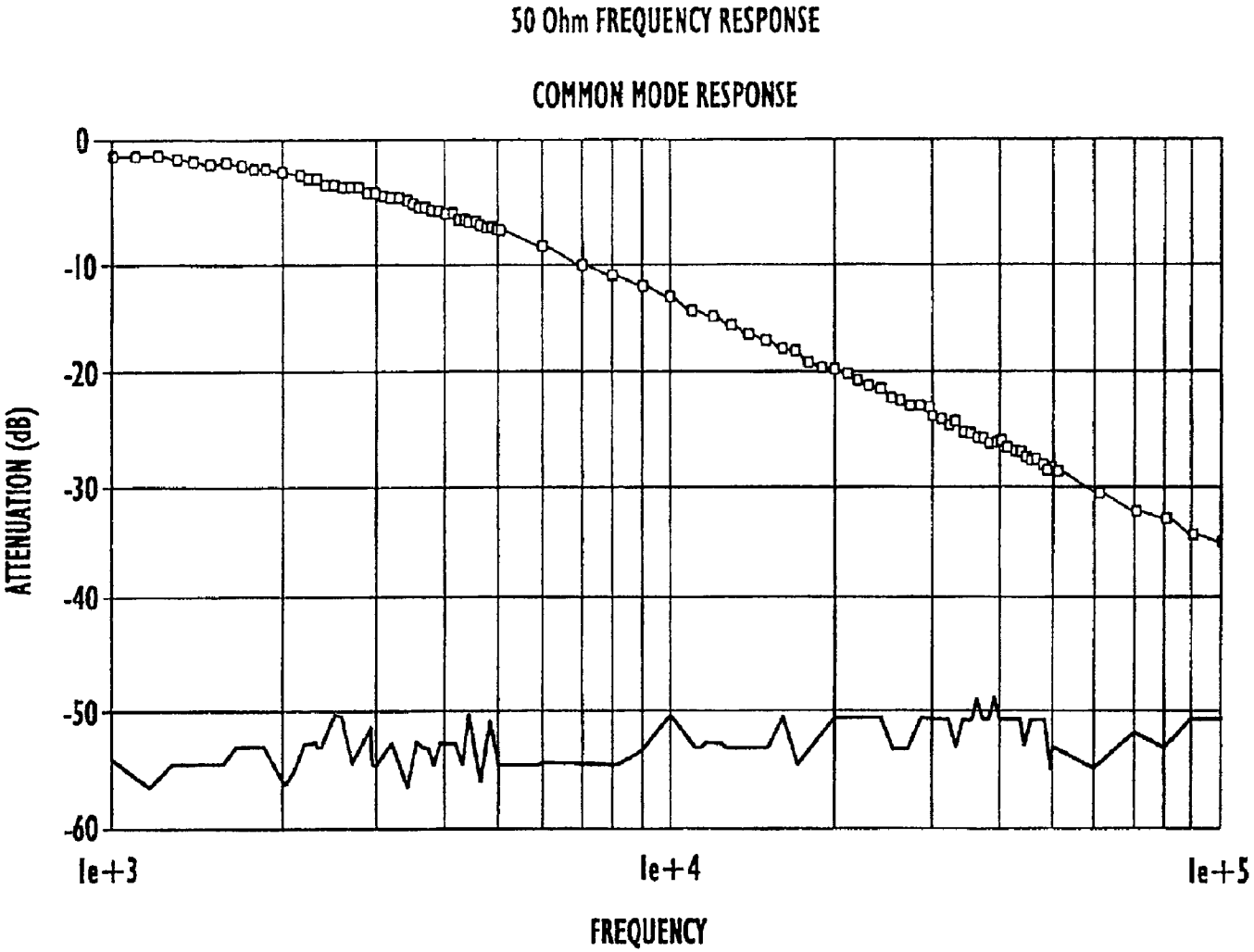
FIG. 2 is a graph depicting the common mode attenuation of interference between 1 kHz and 100 kHz for a conventional capacitor-based circuit and for the circuit of the present invention.

FIG. 2 illustrates a direct comparison of the common mode (50 ohm) frequency response of the circuit of the present invention (solid line) and a commercial embodiment of the circuit disclosed in U.S. Pat. No. 5,721,661 (line of connected squares) under correct wiring conditions. As can be seen from FIG. 2, while the prior art circuit employing a capacitor attenuates disturbances at 1 kHz by less than 3 dB, the circuit of the present invention attenuates disturbances at 1 kHz by approximately 55 dB. At 10 kHz, the interference attenuation of the present invention remains greater than 50 dB, while the prior art circuit provides only about 13 dB of attenuation. Even at 100 kHz, the interference suppression provided by the circuit of the present invention is 15 dB better than that provided by the prior art circuit. Thus, while the circuit of the present invention attenuates all interference in the range between 1 kHz and 100 kHz by approximately 50 dB or more, the capacitor-based prior art circuit begins to provide significant attenuation only at higher frequencies in this range. Consequently, the circuit of the present invention effectively suppresses power line harmonics, whereas the prior art circuit does not.

Furthermore, in contrast to prior art power filter circuits having a capacitor connected between the neutral and ground conductors under normal polarity conditions, the circuit of the present invention has a steady-state voltage of zero between the neutral and ground conductors, thereby providing superior protection to equipment sensitive to steady-state voltage across the neutral and voltage conductors. By way of contrast, the circuit disclosed in U.S. Pat. No. 5,721,661 always has a steady-state voltage between the neutral and ground conductors when correct polarity is detected, since a voltage inherently develops across the capacitor connected between neutral and ground. This steady-state voltage is undesirable, since certain types of equipment are sensitive to steady-state neutral-to-ground potential differences.

Moreover, because the power filter circuit of the present invention does not include any clamping devices or capacitor circuit elements that are connectable between the neutral and ground conductors, the cost of the circuit of the present invention is reduced as compared to prior art power circuits requiring such devices and elements. Nevertheless, the circuit of the first embodiment of the present invention meets UL current leakage requirements while providing superior suppression of neutral-to-ground voltage and disturbances that could only otherwise be achieved with an expensive transformer-based product, thereby minimizing the risk of damage or disruption to sensitive electronic equipment.

Figure 3:
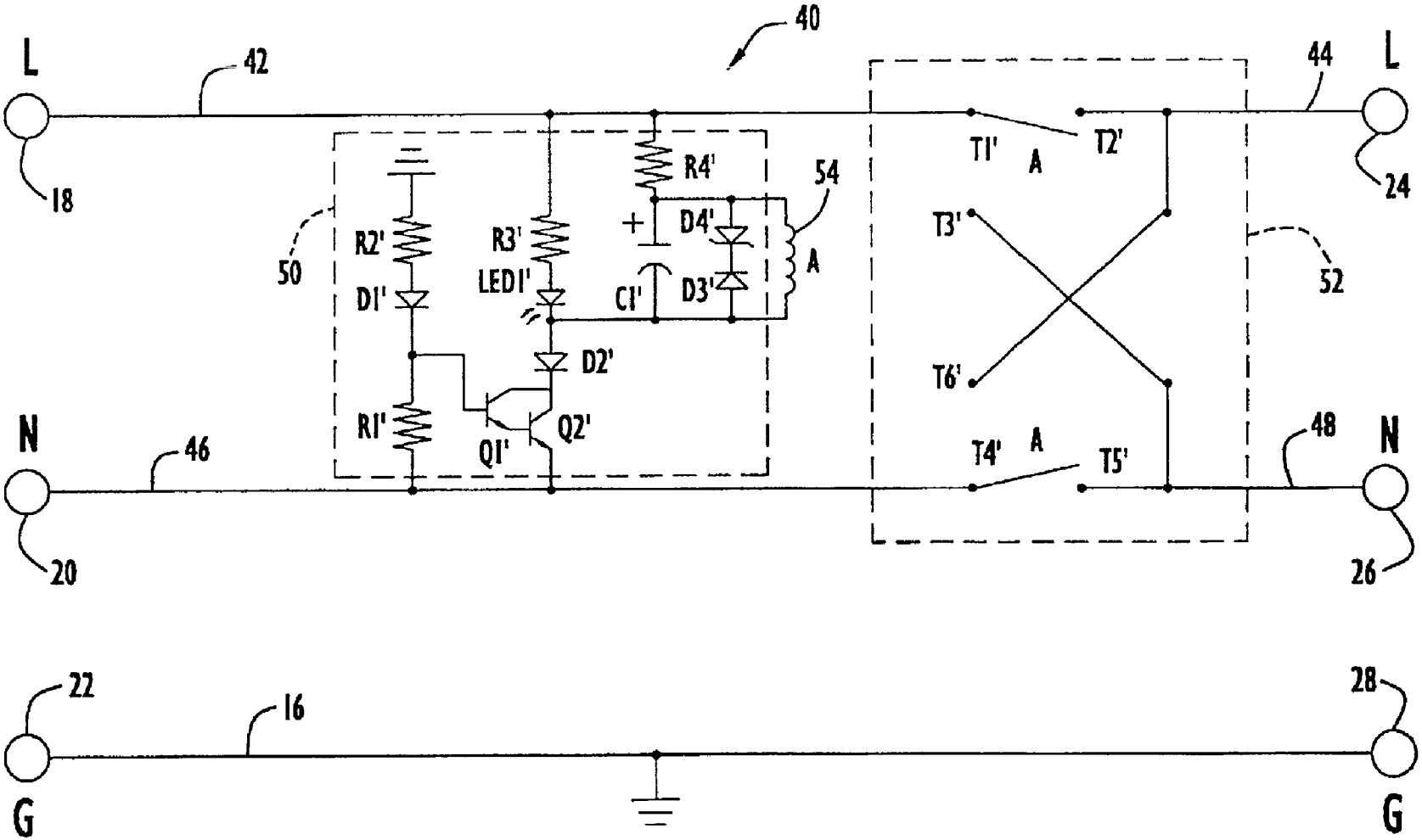
FIG. 3 is a schematic illustration of a power filter circuit according to a second embodiment of the present invention.

FIG. 3 illustrates a power filter circuit 40 capable of correcting a reverse polarity condition detected by a sensing circuit in accordance with a second embodiment of the present invention. In contrast to circuit 10 shown in FIG. 1, in which input line terminal 18 is connected to output line terminal 24 by line conductor 12, in circuit 40, input line terminal 18 is connected to input line conductor 42, and output line terminal 24 is connected to output line conductor 44. Similarly, input neutral terminal 20 is connected to input neutral conductor 46, and output neutral terminal 26 is connected to output neutral conductor 48, as shown in FIG. 3. As in circuit 10, input ground terminal 22 of circuit 40 is connected directly to output ground terminal 28 by ground conductor 16.

Power filter circuit 40 further includes a reverse polarity, fault condition sensing circuit 50 and a switching circuit 52 controlled by sensing circuit 50. In contrast to normal polarity sensing circuit 30 of the first embodiment, reverse polarity sensing circuit 50 supplies power to a relay coil 54 only when all three supply system conductors are connected and a reverse polarity condition exists (i.e., the supply system line and neutral wires are reversed such that there is little or no steady-state potential difference between line and ground). If the integrity of any of the supply system wires is compromised or if a normal polarity condition exists, power is not supplied to the relay coil 54 of switching circuit 52, and the received (normal) polarity is passed to the connected equipment, as explained in greater detail hereinbelow.

The reverse polarity sensing circuit 50 shown in FIG. 3 is similar to normal polarity sensing circuit 30 shown in FIG. 1, except that the components connected to line conductor 12 of circuit 30 are connected to input neutral conductor 46 of circuit 50, and the components connected to neutral conductor 14 of circuit 30 are connected to input line conductor 42 of circuit 50. Consequently, the response of reverse polarity sensing circuit 50 to a reverse polarity condition is the same as the response of normal polarity sensing circuit 30 to a normal polarity condition, i.e., power is supplied to the relay coil 54.

As shown in FIG. 3, reverse polarity fault condition sensing circuit 50 includes a first resistor R1', a diode D1' and a second resistor R2' connected in series between input neutral conductor 46 and ground conductor 16. A first bipolar transistor Q1' has a base connected between resistor R1' and diode D1', an emitter connected to the base of a second bipolar transistor Q2' and a collector connected to the collector of transistor Q2'. The emitter of transistor Q2' is connected to input neutral conductor 46, such that transistors Q1' and Q2' form a Darlington pair. The emitter-to-collector junction of transistor Q2', a second diode D2', a light emitting diode indicator LED1' and a third resistor R3' are connected in series between input neutral conductor 46 and input line conductor 42. The emitter-to-collector junction of transistor Q2' and diode D2' are also connected in series with a capacitor C1' and a fourth resistor R4' between input neutral conductor 46 and input line conductor 42, such that the serial combination of light indicator LED1' and resistor R3' is connected in parallel with the serial combination of capacitor C1' and resistor R4'.

According to the second embodiment, switching circuit 52 comprises a double pole, double throw (DPDT) relay adapted to connect the input and output line and neutral conductors in accordance with the output of reverse polarity sensing circuit 50. As with coil 34 of the first embodiment, coil 54 of the DPDT relay is connected across capacitor C1' and is energized in the same manner as coil 34 of the first embodiment, albeit under reverse polarity conditions rather than normal polarity conditions. A third diode D3' and a Zener diode D4' are connected in series across the relay switching coil 54, i.e, in parallel with coil 54 and also in parallel with capacitor C1' and form a suppressor circuit.

Switching circuit 52 further includes six contacts T1'–T6'. Contact T1' is directly connected to input line conductor 42 and to a pivoting switch that is connectable to either contact T2' or contact T3'. Contact T4' is directly connected to input neutral conductor 46 and to a pivoting switch that is connectable to either contact T5' or contact T6'. Contacts T2' and T6' are connected to output line conductor 44. Contacts T3' and T5' are connected to output neutral conductor 48. The state of the switches connected to contacts T1' and T4' are controlled by relay coil 54, and the letter "A" is shown in FIG. 3 in proximity to coil 54 and the switches to indicate that both switches are controlled by coil 54.

When reverse polarity sensing circuit 50 detects that the supply system circuit has all three conductors connected and a reverse voltage polarity condition exists, light indicator LED1' is energized to produce a visible indication of the integrity of the supply system wiring and a reverse polarity condition, and coil 54 is energized by charged capacitor C1' in the manner described in conjunction with the first embodiment. When coil 54 is energized, the DPDT relay operates such that the switch connected to contact T1' moves into contact with contact T3', and the switch connected to contact T4' moves into contact with contact T6'. With contacts T1' and T3' connected and contacts T4' and T6' connected, the input line conductor 42 is connected to the output neutral conductor 48, and the input neutral conductor 46 is connected to the output line conductor44. In this manner, the reverse polarity seen across the input line and neutral conductor 42 and 44 (with little or no steady-state voltage between the line and ground conductors 42 and 16) is corrected by the switching circuit 52 such that the correct polarity is seen across the output line and neutral conductors 44 and 48 (with little or no steady-state voltage between the output neutral and ground conductors 48 and 16); accordingly, the correct polarity signal is passed to the connected equipment.

When the supply system circuit is wired with a correct polarity or when one of the three conductors of the supply system is disconnected, reverse polarity sensing circuit 50 does not energize coil 54 of the DPDT relay and light indicator LED1' is not illuminated. In this state, the switches are positioned such that contact is made between contacts T1' and T2' and between contacts T4' and T5', so that input line conductor 42 is connected to output line conductor 44 and input neutral conductor 46 is connected to output neutral conductor 48. Consequently, when a normal polarity signal is seen across the input line and neutral conductors 42 and 46, the correct polarity signal is passed to the connected equipment via output line and neutral conductors 44 and 48. Thus, a properly wired supply system (integrity of all three conductor and correct polarity) causes reverse polarity sensing circuit 50 not to energize coil 54, allowing the correct polarity to pass to the connected equipment. Note that, even under reverse polarity conditions, if the integrity of one of the three conductors of the supply system is compromised, coil 54 is not activated and the reverse polarity condition is not corrected by switching circuit 52.

Figure 4:
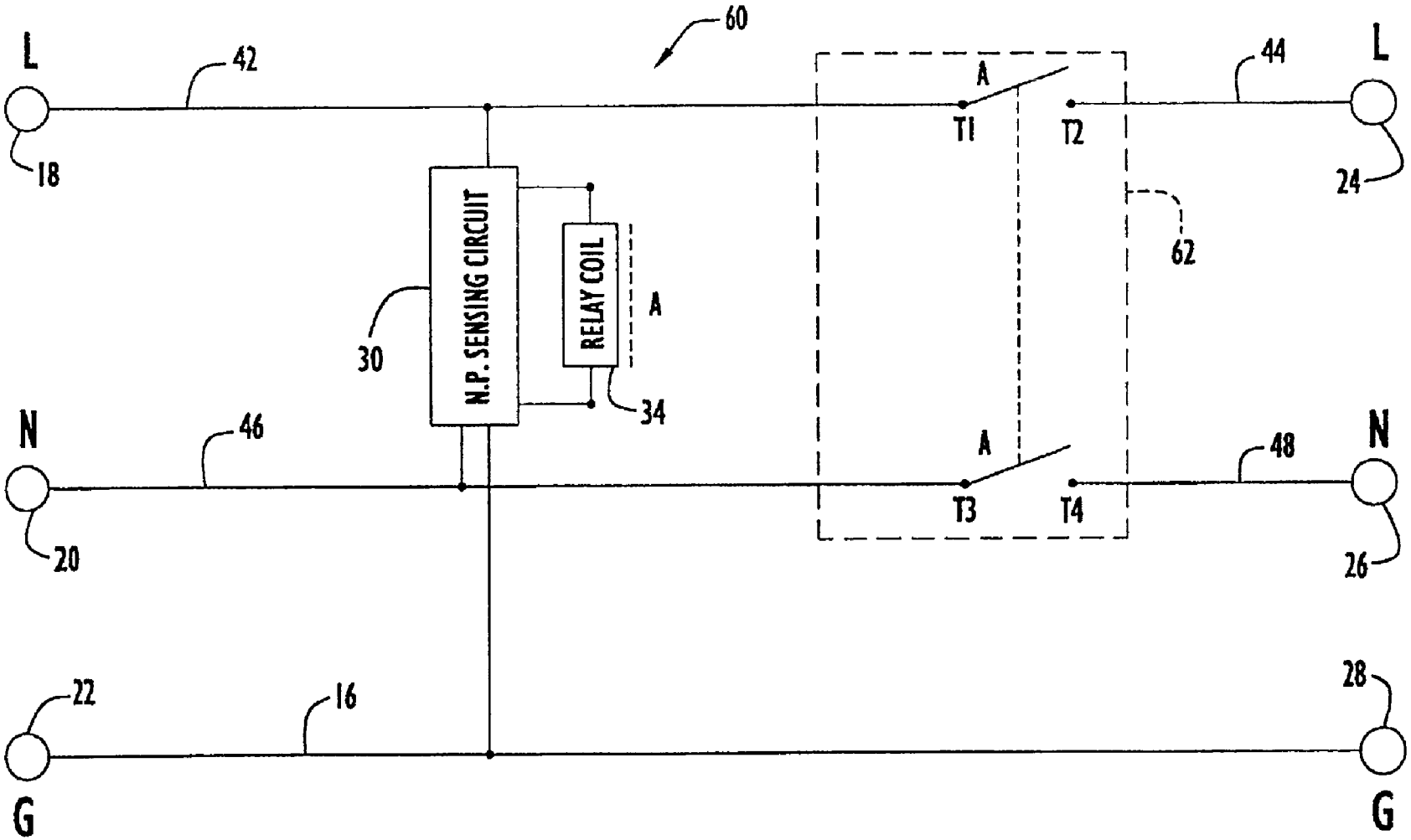
FIG. 4 is a diagrammatic illustration of a power filter circuit according to a third embodiment of the present invention.

A power filter circuit 60 according to a third embodiment of the present invention in which reverse polarity power is never supplied to the connected equipment is shown in FIG. 4. Power filter circuit 60 includes a normal polarity sensing circuit 30 identical to that shown in FIG. 1, connected between input line conductor 42, input neutral conductor 46 and ground conductor 16. Normal polarity sensing circuit 30 controls a relay coil 34 in the manner described in the first embodiment to energize coil 34 only when the integrity of all three conductors is sound and the correct polarity across line and neutral is present.

Power filter circuit 60 further includes a load disconnect switching circuit 62 comprising a normally open double pole, single throw (DPST) relay with its relay switching coil 34 controlling the state of two switches, as designated by the letter "A" in FIG. 4. One contact T1 of the first switch is connected directly to input line conductor 42, while the other contact T2 of the first switch is connected directly to the output line conductor 44. Similarly, one contact T3 of the second switch is connected directly to input neutral conductor 46, while the other contact T4 of the second switch is connected directly to the output neutral conductor 48.

When each of the line, neutral and ground terminals of the supply system is properly wired and connected, the AC line voltage (120 Vrms) appears between input line conductor 42 and input neutral conductor 46 of circuit 60 and between input line conductor 42 and ground conductor 16, thereby causing normal polarity sensing circuit 30 to energize relay coil 34. When energized, relay coil 34 causes the first and second switches to close, thereby connecting contacts T1 and T2 of the first switch and connecting contacts T3 and T4 of the second switch. In this manner, the input and output line conductors 42 and 44 are connected, and the input and output neutral conductors 46 and 48 are connected, enabling the correct polarity power to pass to the connected equipment.

Under any supply system fault conditions, normal polarity sensing circuit 30 does not energize coil 34, and the contacts of the first and second switches remain open (unconnected), causing a break in both the line and neutral conductors of circuit 60 and a disconnection between the supply system and the connected equipment. Consequently, no power is supplied to the connected equipment; power is passed to the connected equipment only if the supply system is properly wired.

To provide protection from overvoltage conditions, an overvoltage protection circuit 66 can be added to the normal polarity sensing circuit 30 to prevent coil 34 from being energized when an overvoltage condition is present. Overvoltage protection circuit 66 is suitable for meeting the UL 1449 requirement which requires filter/suppressor devices to withstand various abnormal overvoltage levels, as described in the standard, without producing a dangerous result.

Figure 5:
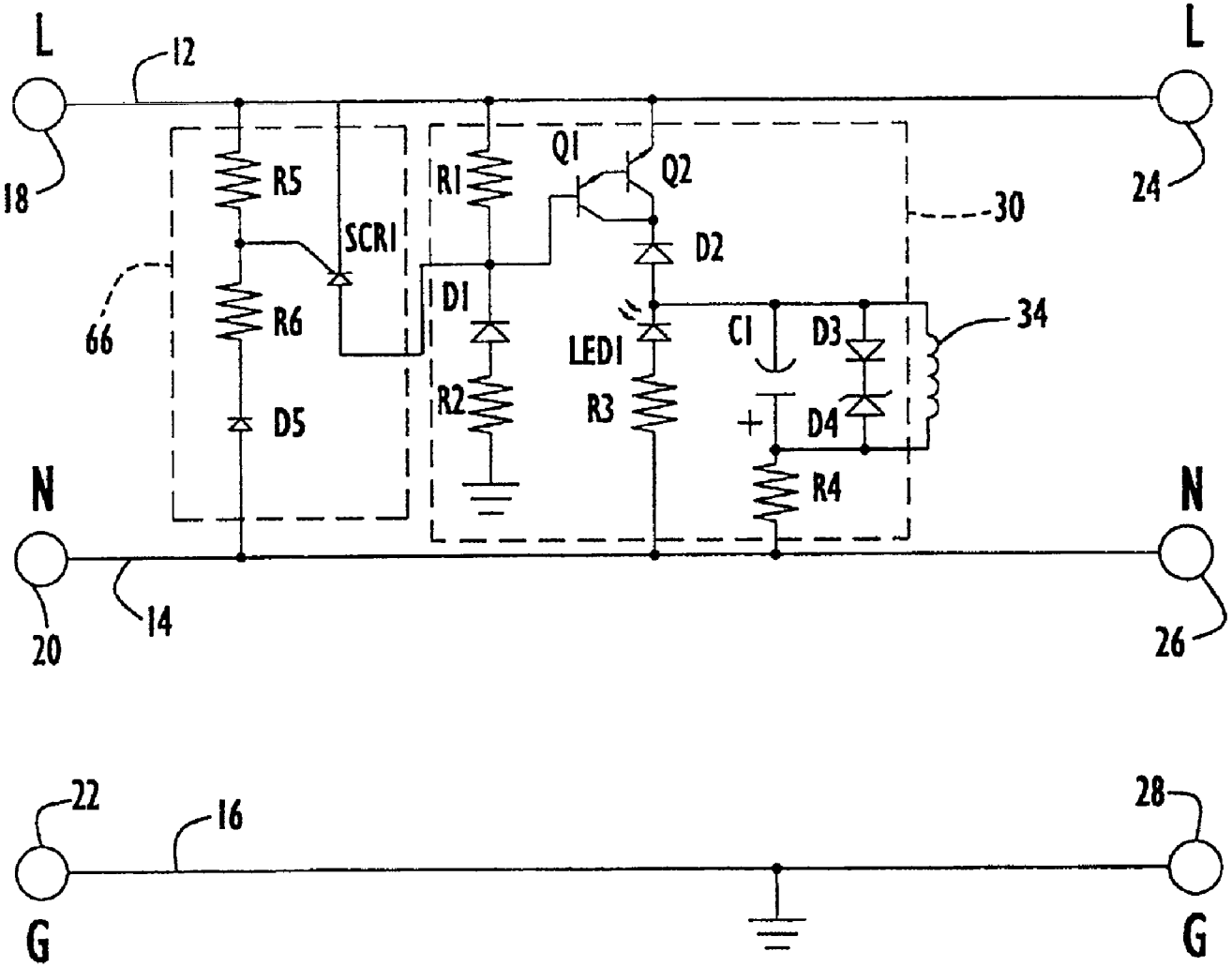
FIG. 5 is a schematic illustration of an overvoltage protection circuit augmenting the normal polarity sensing circuit of the present invention.

As shown schematically in FIG. 5, overvoltage protection circuit 66 comprises first and second biasing resistors R5 and R6, and a PNPN diode D5 (or similar device) connected in series between line conductor 12 and neutral conductor 14. Overvoltage protection circuit further comprises a silicon controlled rectifier SCR1 having its anode connected to the base of transistor Q1 of the Darlington pair of normal polarity sensing circuit 30. The cathode of SCR1 is connected to line conductor 12, and the control gate of SCR1 is connected between resistors R5 and R6.

Overvoltage protection circuit operates to interrupt coil energizing voltage in response to overvoltage conditions, i.e., if the line to neutral voltage rises above some predetermined level, such as 160 Vrms. More specifically, diode D5 is chosen with a breakover voltage equal to the cutout voltage required, e.g., approximately 160 Vrms (225 Vpeak) for a nominal 120 Vrms supply system. If the line to neutral voltage exceeds the breakover voltage of diode D5, PNPN diode D5 latches to an on state and produces a drive voltage through resistor R6 to the gate of SCR1. This gate current causes SCR1 to latch to an on state in which SCR1 conducts. Since SCR1 is arranged in parallel with resistor R1 of normal polarity sensing circuit 30, when SCR1 is on, little or no half-wave rectified voltage appears across resistor R1, thereby removing the base drive to the Darlington pair of normal polarity sensing circuit 30, which in turn removes coil energizing voltage from coil 34, leaving the relay contacts of the switching circuit open.

Use of overvoltage protection circuit 66 with normal polarity sensing circuit 30 is particularly advantageous when used in conjunction with switching circuit 62 (FIG. 4), since the connected equipment and any downstream components of the power filter circuit are protected from the overvoltage condition. Specifically, when coil 34 controls switching circuit 62, overvoltage protection circuit 66 causes the first and second switches to remain open, so that the connected equipment is disconnected during the overvoltage condition and protected from potential damage. Further, any suppression components of the power filter circuit that are downstream (i.e., on the connected equipment side) of the switching circuit 62 are protected by the switch disconnection effected by overvoltage protection circuit 66 (see, e.g., the clamp stage in FIGS. 8 and 9).

Under correct supply system wiring conditions, when the overvoltage condition subsides, PNPN diode D5 will return to a non-conducting off state and SCR1 will drop out of the on state (at the next zero crossing of the line voltage). Consequently, the Darlington pair receives base drive through resistors R2 and D1 (half-wave rectified voltage appears across resistor R1) and turns on. In the manner described above, charging current is then supplied to capacitor C1 which energizes coil 34, causing the switching contacts of the switching circuit to close. Thus, under non-overvoltage conditions, overvoltage protection circuit does not affect the operation of normal polarity sensing circuit 30.

The overvoltage protection circuit 66 of the present invention can be used in place of a fuse to protect downstream filter components and connected equipment. One problem with conventional fuses is that they are not automatically resettable and, in some configurations, cause devices to pass power without operation of the suppressor components which have been disconnected by tripping of the fuse. Overvoltage protection circuit 66 advantageously returns the power filter circuit of the present invention to a fully operational state once the overvoltage condition subsides.

It will be understood that the present invention is not limited to the specific circuit configurations disclosed herein. For example, while it has been found that relay switches are particularly suitable for implementing the circuit of the present invention, other suitable switching mechanisms can be used in conjunction with the sensing circuit to form a neutral-to-ground short circuit or a polarity switching circuit. Likewise, light emitting elements other than an LED can be used to indicate whether or not the power circuit has been wired correctly (e.g., an LCD display), and other types of indicators, such as aural indicators, can be used.

Various combinations of the sensing circuits, switching circuits and overvoltage protection circuit of the present invention can be used within a complete power filter system in order to provide both reverse polarity correction (or disconnection) and superior neutral-to-ground common mode interference suppression. For example, the sensing, switching and overvoltage protection circuits disclosed herein can be added as a fourth stage to the three-stage power filter circuit disclosed in U.S. Pat. No. 5,136,455, incorporated herein by reference in its entirety. That is, combinations of the circuits of the present invention can be connected to the input or the output of the clamping stage of the three-stage filter in order to provide improved common mode suppression and a supply system fault condition indication. FIGS. 6–9 illustrate four examples of use of the circuits of the present invention within a complete power filter device.

Figure 6:
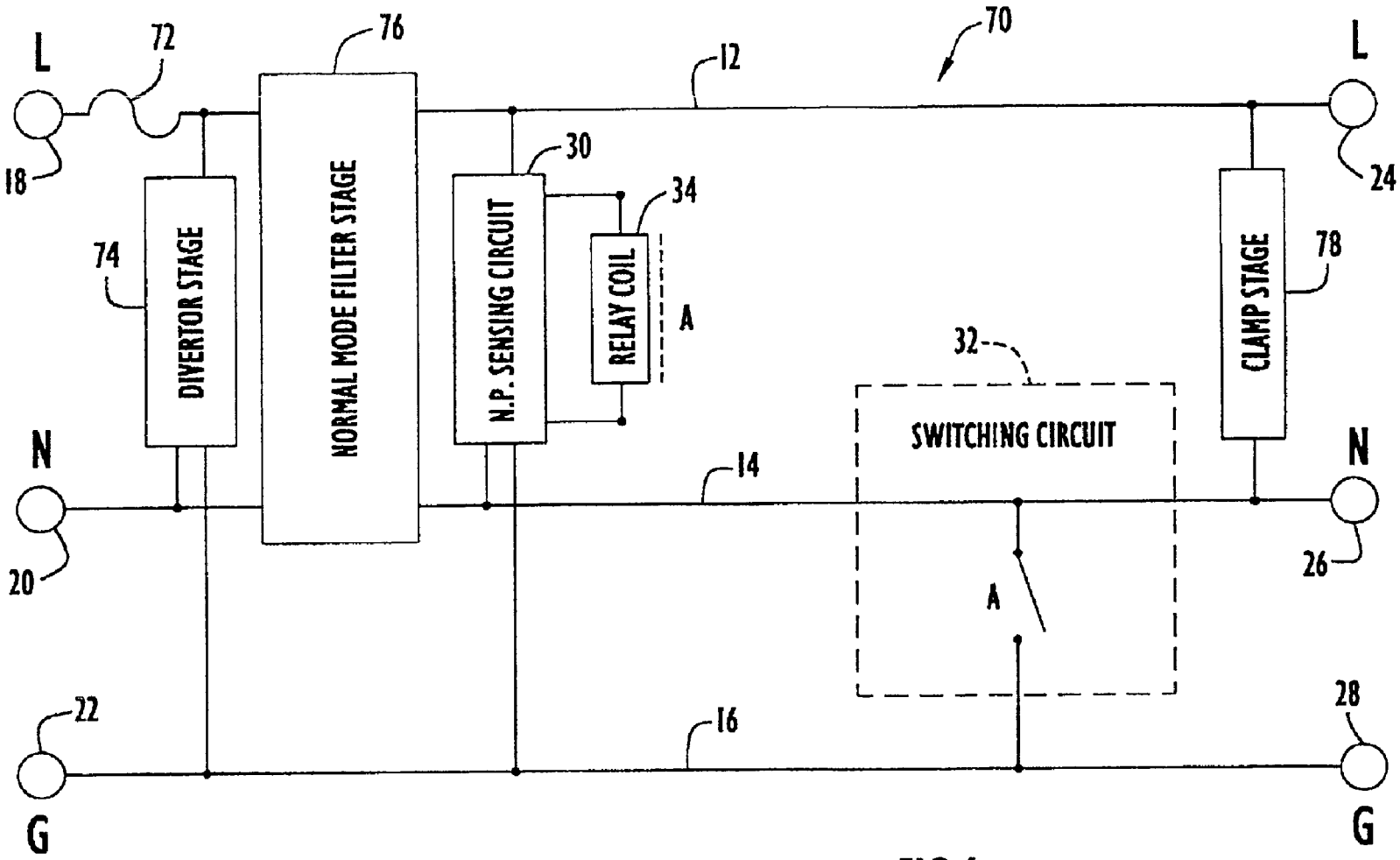
FIG. 6 is a diagrammatic illustration of a power filter circuit according to a fourth embodiment of the present invention, incorporating the power filter circuit of the first embodiment.

FIG. 6 illustrates a complete power filter circuit 70 according to a fourth embodiment of the present invention in which normal polarity sensing circuit 30 and switching circuit 32 of the first embodiment are used in conjunction with other power filtering circuitry. An overload protection stage 72 is located along line conductor 12 upstream (i.e., on the supply system side) of the other circuit components. Overload protection stage 72 can comprise a line fuse used to protect the components of circuit 70 from possible overload conditions. Downstream of overload protection stage 72 is a diverter stage 74 connected between the line, neutral and ground conductors 12, 14 and 16, followed by a normal mode filter stage 76 connected between the line and neutral conductors 12 and 14. For example, diverter stage 74 and normal mode filter stage 76 can be similar to those disclosed in U.S. Pat. No. 5,136,455 and function to suppress voltage transients and RFI disturbances. As shown diagrammatically in FIG. 6, downstream of normal mode filter stage 76, normal mode sensing circuit 30, coil 34 and switching circuit 32 are arranged as described above in accordance with the first embodiment (FIG. 1). When the supply circuit is properly wired (normal polarity and with the integrity of all three conductors), normal polarity sensing circuit 30 controls (denoted by "A") switching circuit 32 to form a short circuit between neutral conductor 14 and ground conductor 16, thereby providing excellent common mode EMI suppression. Preferably, overvoltage protection circuit 66 is not included in this configuration, since it would remove only the neutral-to-ground bond without achieving its primary objective of preventing the overvoltage from reaching the connected equipment. A clamping circuit 78, such as that disclosed in U.S. Pat. No. 5,136,455 is located downstream of switching circuit 32 and serves to eliminate any residual voltage transients prior to passing the filtered power to the connected equipment.

Figure 7:
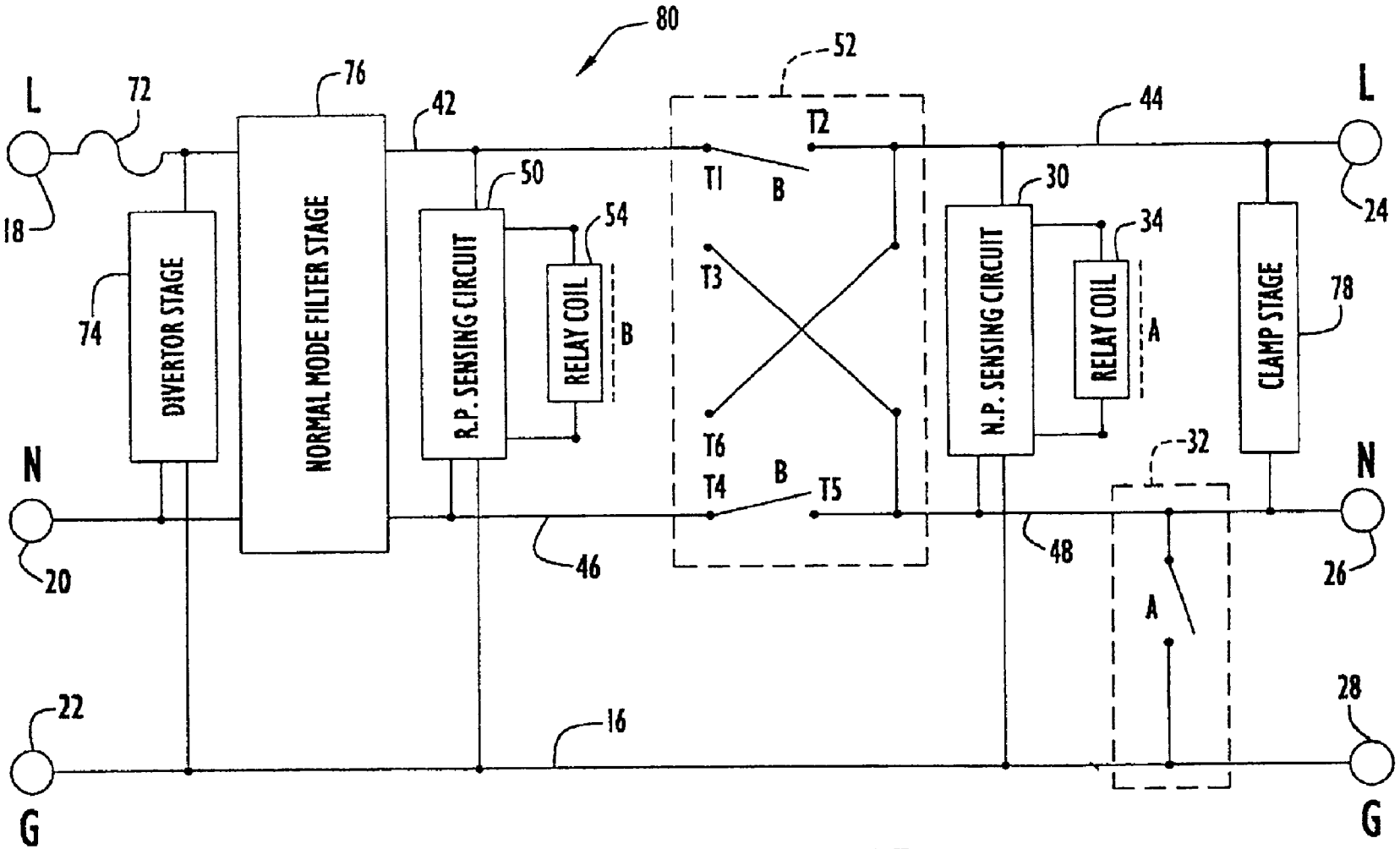
FIG. 7 is a diagrammatic illustration of a power filter circuit according to a fifth embodiment of the present invention, incorporating the power filter circuits of the first and second embodiments.

A power filter circuit 80 incorporating both a polarity correction switching circuit and a neutral-to-ground short circuit switch is shown in FIG. 7 in accordance with a fifth embodiment of the present invention. Following overload protection stage 72, diverter stage 74 and filter stage 76, reverse polarity sensing circuit 50, relay coil 54, and DPDT switching circuit 52 are arranged as described above in accordance with the second embodiment (FIG. 3). Further, normal polarity sensing circuit 30, relay coil 34 and switching circuit 32 of the first embodiment are arranged downstream of switching circuit 52, followed by clamping circuit 78.

As described above, reverse polarity sensing circuit 50 controls (shown with "B") the switching of switching circuit 52 to correct a sensed reverse polarity (with integrity of all three conductors) or to pass a correct polarity. As explained above, however, switching circuit 52 passes a reverse polarity signal without correction when the integrity of any of the three conductors of the supply system is compromised, e.g., disconnected.

Consequently, to ensure that an EMI-suppressing short circuit connection can be formed between neutral and ground without risk of shorting a 120 Vrms signal to ground, a normal polarity sensing circuit 30, relay coil 34 and switching circuit 32 are disposed downstream of switching circuit 52 and arranged in the manner described in accordance with the first embodiment. As can be seen from FIG. 7, when reverse polarity sensing circuit 50 and switching circuit 52 operate to correct a reverse polarity received from the supply circuit, normal polarity sensing circuit 30 receives and senses the corrected polarity signal and controls (shown with "A") switching circuit 32 via coil 34 to form a short circuit between neutral and ground to provide common mode EMI suppression. When a reverse polarity signal is received while one of the conductors of the supply system is disconnected, e.g., the line or ground conductor, coil 54 is not energized, and switching circuit 52 passes the reverse polarity signal to the normal polarity sensing circuit and to the connected equipment. Under these conditions, normal polarity sensing circuit 30 does not close switching circuit 32 to prevent the 120 Vrms between neutral and ground from being shorted to ground.

Under normal polarity conditions, with or without the integrity of all three conductors of the supply system, switching circuit 52 is controlled by reverse polarity sensing circuit 50 via unenergized coil 54 to pass the correct polarity signal, and normal polarity sensing circuit 30 and switching circuit 32 operate in the manner described above in accordance with the first embodiment. Preferably, overvoltage protection circuit 66 is not used in conjunction with normal polarity sensing circuit 30 in the circuit shown in FIG. 7, since it would remove only the neutral-to-ground bond without achieving its primary objective of preventing the overvoltage from reaching the connected equipment. Also, overvoltage protection circuit 66 would not be suitable for use with reverse polarity sensing circuit 50, since it would cause switching circuit 52 to pass a reverse polarity signal that would otherwise be corrected, without preventing the overvoltage signal from reaching the connected equipment.

Figure 8:
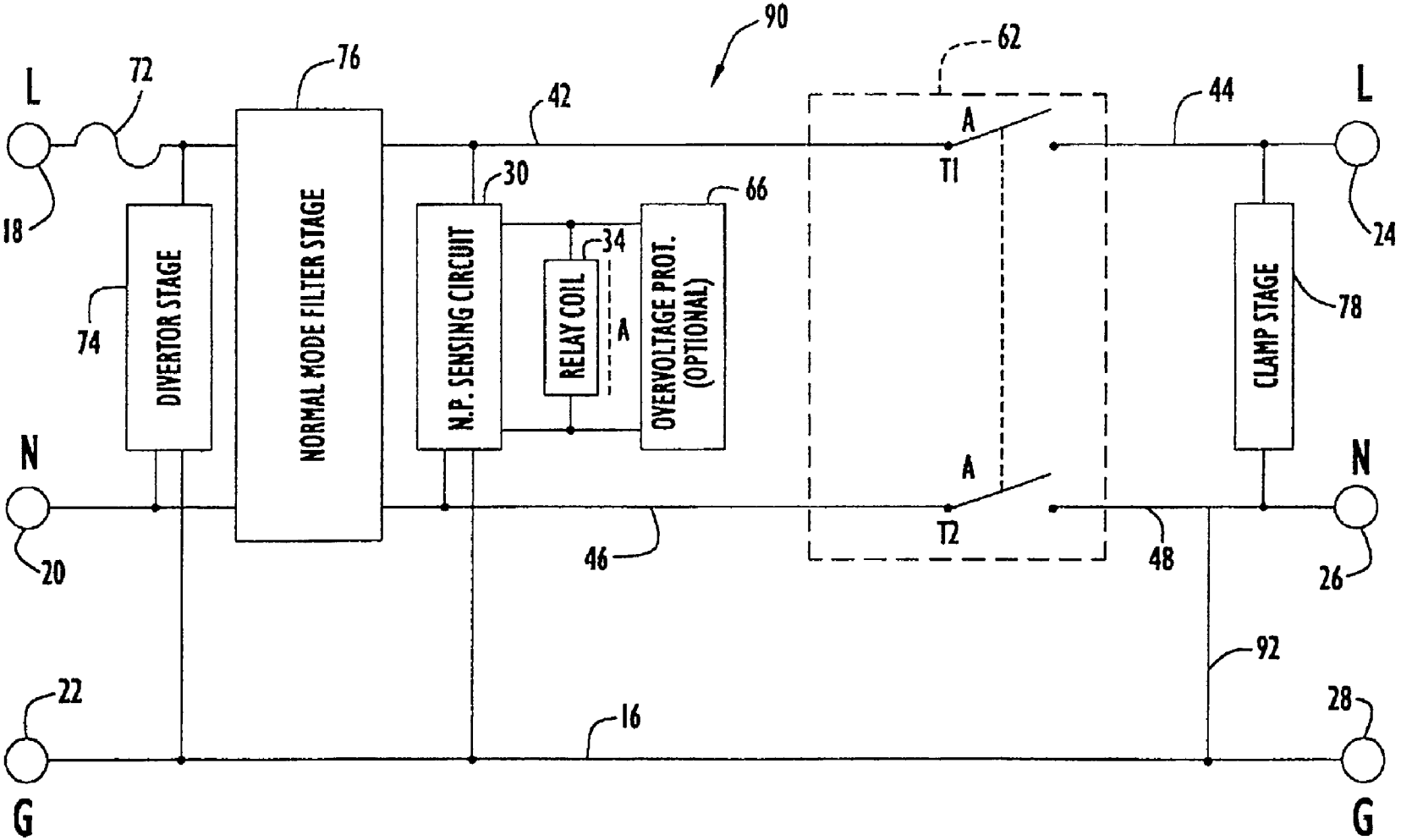
FIG. 8 is a diagrammatic illustration of a power filter circuit according to a sixth embodiment of the present invention, incorporating the power filter circuit of the third embodiment of the present invention and the overvoltage protection circuit shown in FIG. 5.

FIG. 8 illustrates yet another power filter circuit 90 in accordance with a sixth embodiment of the present invention, wherein load disconnect switching circuit 62 of the third embodiment is used in conjunction normal polarity sensing circuit 30 and overvoltage protection circuit 66. Specifically, between normal mode filter stage 76 and clamp stage 78, there is disposed normal polarity sensing circuit 30 controlling (shown with "A") switching circuit 62 via relay coil 34 in the manner described above in accordance with the third embodiment (see FIG. 4). Specifically, the switches of switching circuit 62 are closed to connect the input line conductor 42 to the output line conductor 44 and to connect the input neutral conductor 46 to the output neutral conductor 48 only when the supply system is correctly wired (with normal polarity and integrity of all three connectors). Downstream of switching circuit 62, output neutral conductor 48 is permanently connected to ground conductor 16 via a short-circuit conductor 92 which forms a permanent short circuit between conductors 48 and 16. Since switching circuit 62 passes the supply system power to the output conductors 44 and 48 only when the supply system is correctly wired, short-circuit conductor 92 operates to provide common mode EMI suppression only under correct wiring conditions and never shorts the 120 Vrms signal to the ground conductor 16.

In accordance with the sixth embodiment, overvoltage protection circuit 66 can optionally be connected to normal polarity sensing circuit 30 in the manner shown in FIG. 5 in order to prevent switch 62 from passing a high voltage signal to the connected equipment under correct wiring conditions.

Figure 9:
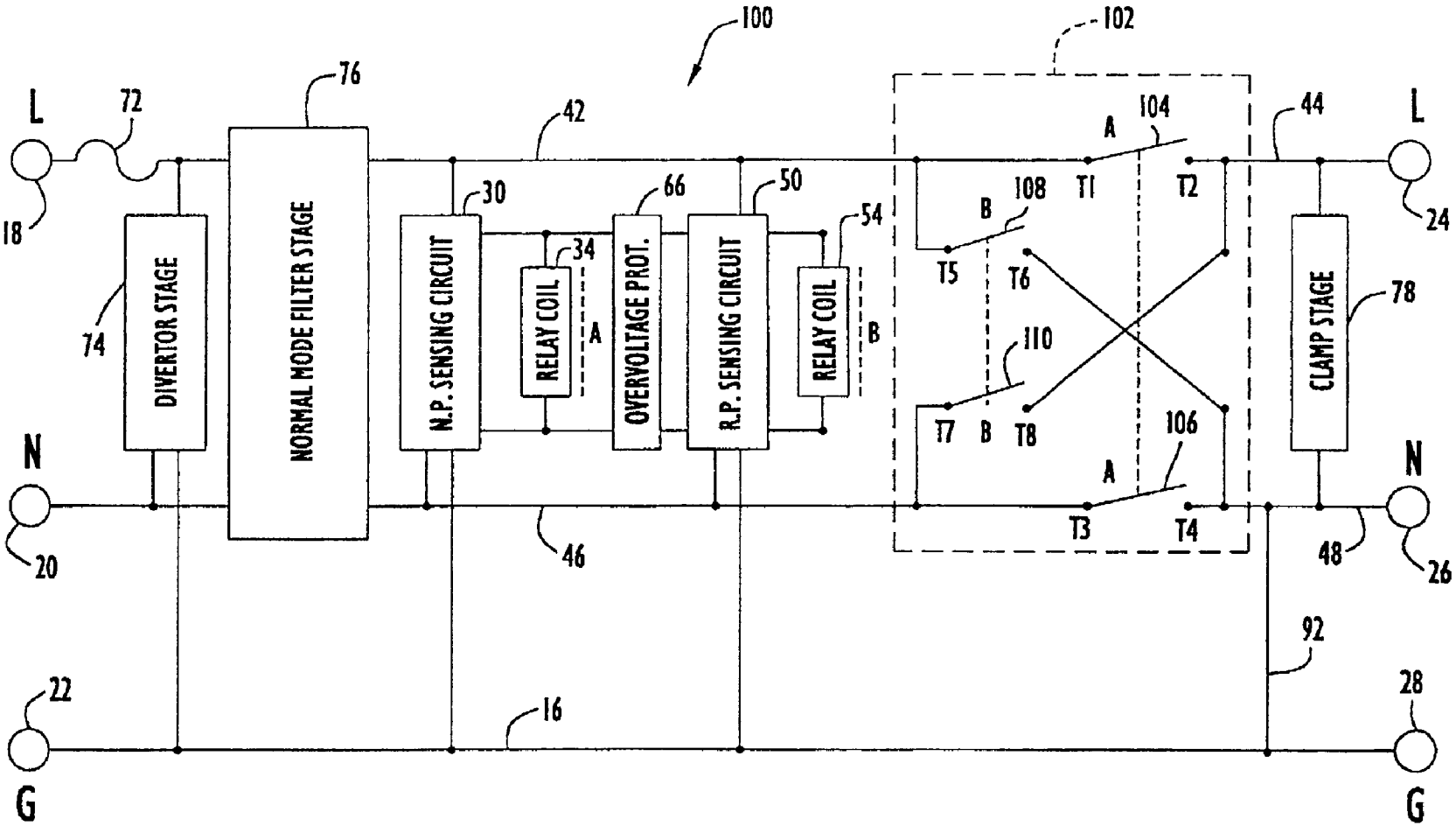
FIG. 9 is a diagrammatic illustration of a power filter circuit according to a seventh embodiment of the present invention.

FIG. 9 is a diagrammatic illustration of a power filter circuit 100 according to a seventh embodiment of the present invention, wherein both normal and reverse polarity sensing circuits are used to control double pole single throw (DPST) switches to respectively connect either a received normal polarity signal or a corrected reverse polarity signal. Between normal mode filter stage 76 and clamp stage 78, there is connected a normal polarity sensing circuit 30 controlling (shown with "A") first and second switches 104 and 106 of a switching circuit 102 via relay coil 34, followed by a reverse polarity sensing circuit 50 controlling (shown with "B") third and fourth switches 108 and 110 of switching circuit 102 via relay coil 54.

Relay coil 34 and switches 104 and 106 form a DPST relay switch, as do relay coil 54 and switches 108 and 110. Contacts T1 and T2 of switch 104 are respectively connected to input and output line conductors 42 and 44, and contacts T3 and T4 of switch 106 are respectively connected to input and output neutral conductors 46 and 48. Switches 104 and 106 are controlled by normal polarity sensing circuit 30 in the same manner as the switches of switching circuit 62 (FIGS. 4 and 8) to pass the power from the supply system to the connected equipment only when the supply circuit is properly wired (integrity of all three conductors and correct polarity).

Contacts T5 and T6 of switch 108 are respectively connected to input line conductor 42 and output neutral conductor 48, and contacts 7 and T8 of switch 110 are respectively connected to input neutral conductor 46 and output line conductor 44. When reverse polarity sensing circuit 30 senses a reverse polarity signal with integrity of all three conductors of the supply system, relay coil 54 is energized and closes switches 108 and 110, thereby passing a corrected polarity to output line and neutral conductors 44 and 48. Otherwise, switches 108 and 110 remain open. Note that no power signal is passed to the connected equipment, regardless of polarity, whenever the integrity any one of the three conductors of the supply system is compromised (disconnected).

As with the circuit 90 shown in FIG. 8, circuit 100 includes a short-circuit conductor 92 connected downstream of switching circuit 102 between output neutral conductor 48 and ground conductor 16. Since only the correct polarity is ever seen across the output line and neutral conductors 44 and 48, short-circuit conductor 92 can safely provide normal mode EMI suppression without risk of shorting a 120 Vrms signal to ground.

Optionally, overvoltage protection circuit 66 can be connected to normal polarity sensing circuit 30 in the manner shown in FIG. 5 and to reverse polarity sensing circuit 50 in a similar manner in order disconnect power from the connected equipment, thereby preventing a high voltage signal from reaching the connected.

It will be understood that use of the sensing, switching and overvoltage protection circuits of the present invention within complete power filter systems is not limited to the particular systems shown in FIGS. 6–9, and other power filter circuit components and arrangements can be used in conjunction with the sensing, switching and overvoltage protection circuits of the present invention.

Having described preferred embodiments of a power filter circuit responsive to supply system fault conditions, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A circuit for controlling electromagnetic interference, comprising:

a line conductor, a neutral conductor and a ground conductor, each connectable to a load and to a supply system having line, neutral and ground connectors, to provide an electrical connection between the supply system and the load;

a wiring fault condition sensing circuit connected to said line conductor, said neutral conductor and said ground conductor, said sensing circuit being configured to determine whether the line, neutral and ground connectors of the supply system are correctly wired and connected; and a switch activated by said sensing circuit to form a short circuit between said neutral conductor and said ground conductor, irrespective of a voltage level appearing across said neutral conductor and said ground conductor, when all of the line, neutral and ground connectors of the supply system are correctly wired and connected.

2. The circuit according to claim 1, wherein said switch is not activated by said sensing circuit and a short circuit is not formed between said neutral conductor and said ground conductor when said sensing circuit detects that any one or any combination of the line, neutral and ground connectors of the supply system is not correctly wired or connected.

3. The circuit according to claim 1, wherein said switch has a first contact connected directly to said neutral conductor and a second contact connected directly to said ground conductor, said first and second contacts being connected by closure of said switch.

4. The circuit according to claim 1, wherein said short circuit suppresses all voltage transients present across said neutral conductor and said ground conductor.

5. The circuit according to claim 1, wherein said switch comprises a switching relay having a switching relay coil and a switch element connectable between first and second contacts.

6. The circuit according to claim 5, wherein said sensing circuit comprises:

a voltage rectifier circuit connected between said line conductor and said ground conductor;

a visual indicator adapted to produce an indication of a state of the supply system; and a first transistor and a second transistor arranged as a Darlington pair and responsive to a rectified voltage produced by said voltage rectifier circuit to supply drive current to said visual indicator and to said switching relay coil in order to activate said visual indicator and said switching relay coil when all of the line, neutral and ground connectors of the supply system are correctly wired and connected.

7. The circuit according to claim 6, wherein:

said voltage rectifier circuit comprises a first resistor, a diode and a second resistor connected in series between said line conductor and said ground conductor;

a base of said first transistor is connected to a terminal of said first resistor that is connected to a terminal of said first diode;

a base of said second transistor is connected to an emitter of said first transistor, an emitter of said second transistor is connected to said line conductor, and a collector of said second transistor is connected to a collector of said first transistor;

said sensing circuit further comprising:

a second diode and a third resistor connected in series with an emitter-collector junction of said second diode and said visual indicator between said line conductor and said neutral conductor;

a capacitor and a fourth resistor connected in series with the emitter-collector junction of said second transistor and said second diode between said line conductor and said neutral conductor, wherein said switching relay coil is connected across said capacitor; and a suppression circuit connected in parallel with said capacitor and adapted to suppress switching transients produced by said switching relay coil.

8. The circuit according to claim 7, wherein said suppression circuit comprises a diode and a Zener diode connected in series.

9. The circuit according to claim 5, wherein said switching relay comprises a single pole, single throw relay.

10. The circuit according to claim 1, further comprising:

an overload protection stage adapted to protect the load from overload conditions;

a diverter stage adapted to suppress transient overvoltages;

a normal mode filtering stage adapted to suppress normal mode electromagnetic interference; and a clamping stage adapted to suppress residual voltage transients.

11. A circuit for detecting and automatically correcting for an incorrectly wired AC power supply system, comprising:

an input line conductor and an input neutral conductor, each connectable to a supply system having line, neutral and ground connectors;

an output line conductor and an output neutral conductor, each connectable to a load;

a ground conductor connectable to said supply system and said load;

a switch coupled to the input and output line and neutral conductors and having a first state in which the input line conductor is connected to the output line conductor and the input neutral conductor is connected to the output neutral conductor and a second state in which the input line conductor is connected to the output neutral conductor and the input neutral conductor is connected to the output line conductor; and a reverse polarity wiring fault condition sensing circuit connected to said input line conductor, said input neutral conductor and said ground conductor, said reverse polarity sensing circuit controlling said switch to be in the second state only when said reverse polarity sensing circuit detects that all three of the line, neutral and ground connectors of the supply system are connected, with the ground connector correctly wired but with the line and neutral connectors reversed, such that when an AC voltage is present across the neutral and ground connectors of the supply system and across the neutral and line connectors of the supply system, the AC voltage is present across the output line conductor and the ground conductor at the load.

12. The circuit according to claim 11, wherein when said reverse polarity sensing circuit does not detect that all of the line, neutral and ground connectors of the supply system are connected with the ground connector correctly wired but with the line and neutral connectors reversed, said switch remains in the first state.

13. The circuit according to claim 11, wherein said switch comprises a double pole, double throw relay having a first contact connected to said input line conductor, a second contact connected to said output line conductor, a third contact connected to said output neutral conductor, a fourth contact connected to said input neutral conductor, a fifth contact connected to said output neutral conductor, and a sixth contact connected to said output line conductor, wherein:

in the second state, said first and third contacts are connected and said fourth and sixth contacts are connected; and in the first state, said first and second contacts are connected and said fourth and fifth contacts are connected.

14. The circuit according to claim 11, wherein said switch comprises a switching relay having a switching relay coil, a first switching element controlled by said switching relay coil to be in one of two states, and a second switching element controlled by said switching relay coil to be in one of two states, current to said visual indicator and to said switching relay coil in order to activate said visual indicator and said switching relay coil when the integrity of all of the line, neutral and ground connectors of the supply system is sound and the supply system presents a reverse polarity voltage across the line and neutral connectors.

15. The circuit according to claim 14, wherein said sensing circuit comprises:

a voltage rectifier circuit connected between said input neutral conductor and said ground conductor;

a visual indicator adapted to produce an indication of a state of the supply system; and a first transistor and a second transistor arranged as a Darlington pair and responsive to a rectified voltage produced by said voltage rectifier circuit to supply drive current to said visual indicator and to said switching relay coil in order to activate said visual indicator and said switching relay coil when all of the line, neutral and ground connectors of the supply system are connected, with the ground connector correctly wired but with the line and neutral connectors reversed.

16. The circuit according to claim 15, wherein:

said voltage rectifier circuit comprises a first resistor, a diode and a second resistor connected in series between said input neutral conductor and said ground conductor;

a base of said first transistor is connected to a terminal of said first resistor that is connected to a terminal of said first diode;

a base of said second transistor is connected to an emitter of said first transistor, an emitter of said second transistor is connected to said input neutral conductor, and a collector of said second transistor is connected to a collector of said first transistor;

said sensing circuit further comprising:

a second diode and a third resistor connected in series with an emitter-collector junction of said second diode and said visual indicator between said input neutral conductor and said input line conductor;

a capacitor and a fourth resistor connected in series with the emitter-collector junction of said second transistor and said second diode between said input neutral conductor and said input line conductor, wherein said switching relay coil is connected across said capacitor; and a suppression circuit connected in parallel with said capacitor and adapted to suppress switching transients produced by said switching relay coil.

17. The circuit according to claim 16, wherein said suppression circuit comprises a diode and a Zener diode connected in series.

18. The circuit according to claim 11, further comprising:

a normal polarity, wiring fault condition sensing circuit connected to said output line conductor, said output neutral conductor and said ground conductor, said normal polarity sensing circuit being configured to determine whether an integrity of each of the line, neutral and ground connectors of the supply system is sound and whether a correct polarity voltage is present across said output line conductor and said output neutral conductor; and a short-circuit switch activated by said normal polarity sensing circuit to form a short circuit between said output neutral conductor and said output ground conductor, irrespective of a voltage level appearing across said neutral conductor and said ground conductor, when the integrity of all of the line, neutral and ground connectors of the supply system is sound and a correct polarity is present across said output line conductor and said output neutral conductor.

19. The circuit according to claim 18, wherein said short-circuit switch is not activated by said normal polarity sensing circuit and a short circuit is not formed between said output ground conductor and said output neutral conductor when said normal polarity sensing circuit detects that any of the line, neutral and ground connectors of the supply system is disconnected.

20. The circuit according to claim 19, wherein said short-circuit switch has a first contact connected directly to said output neutral conductor and a second contact connected directly to said ground conductor, said first and second contacts being connected by closure of said short-circuit switch.

21. The circuit according to claim 18, wherein said short-circuit switch is a single pole, single throw relay.

22. The circuit according to claim 18, further comprising:

an overload protection stage adapted to protect the load from overload conditions;

a diverter stage adapted to suppress transient overvoltages;

a normal mode filtering stage adapted to suppress normal mode electromagnetic interference; and a clamping stage adapted to suppress residual voltage transients.

23. A circuit for controlling electromagnetic interference, comprising:

an input line conductor and an input neutral conductor, each connectable to a supply system having line, neutral and ground connectors;

an output line conductor and an output neutral conductor, each connectable to a load;

a ground conductor connectable to said supply system and said load;

a normal polarity wiring fault condition sensing circuit connected to said input line conductor, said input neutral conductor and said ground conductor, said normal polarity sensing circuit being configured to determine whether the line, neutral and ground connectors of the supply system are correctly wired and connected;

a normal polarity switch circuit activated by said normal polarity sensing circuit to connect said input line conductor to said output line conductor and to connect said input neutral conductor to said output neutral conductor when all of the line, neutral and ground connectors of the supply system are correctly wired and connected;

a reverse polarity wiring fault condition sensing circuit connected to said input line conductor, said input neutral conductor and said ground conductor said reverse polarity sensing circuit being configured to determine whether each of the line, neutral and ground connectors of the supply system is connected and whether an AC voltage is present across the neutral and ground connectors; and a reverse polarity switch circuit activated by said reverse polarity sensing circuit to connect said input line conductor to said output neutral conductor and to connect said input neutral conductor to said output line conductor when all of the line, neutral and ground connectors of the supply system are connected and an AC voltage is present across the neutral and ground connectors.

24. The circuit according to claim 23, wherein said normal polarity switch circuit is not activated by said normal polarity sensing circuit, said input line conductor is not connected to said output line conductor, and said input neutral conductor is not connected to said output neutral conductor when said normal polarity sensing circuit detects that any one or any combination of the line, neutral and ground connectors of the supply system is not correctly wired or connected.

25. The circuit according to claim 23, further comprising:

an overvoltage protection circuit causing said normal polarity sensing circuit not to activate said normal polarity switch circuit during an overvoltage condition, whereby said input line conductor is not connected to said output line conductor, and said input neutral conductor is not connected to said output neutral conductor.

26. The circuit according to claim 23, wherein said normal polarity switch circuit comprises a double pole, single throw switching relay having a switching relay coil, a first switch element connectable between said input line conductor and said output line conductor and a second switch element connectable between said input neutral conductor and said output neutral conductor.

27. The circuit according to claim 26, wherein said normal polarity sensing circuit comprises:

a voltage rectifier circuit connected between said line conductor and said ground conductor;

a visual indicator adapted to produce an indication of a state of the supply system; and a first transistor and a second transistor arranged as a Darlington pair and responsive to a rectified voltage produced by said voltage rectifier circuit to supply drive current to said visual indicator and to said switching relay coil in order to activate said visual indicator and said switching relay coil when all of the line, neutral and ground connectors of the supply system are correctly wired and connected.

28. The circuit according to claim 27, wherein:

said voltage rectifier circuit comprises a first resistor, a diode and a second resistor connected in series between said line conductor and said ground conductor;

a base of said first transistor is connected to a terminal of said first resistor that is connected to a terminal of said first diode;

a base of said second transistor is connected to an emitter of said first transistor, an emitter of said second transistor is connected to said line conductor, and a collector of said second transistor is connected to a collector of said first transistor;

said sensing circuit further comprising:

a second diode and a third resistor connected in series with an emitter-collector junction of said second diode and said visual indicator between said line conductor and said neutral conductor;

a capacitor and a fourth resistor connected in series with the emitter-collector junction of said second transistor and said second diode between said line conductor and said neutral conductor, wherein said switching relay coil is connected across said capacitor; and a suppression circuit connected in parallel with said capacitor and adapted to suppress switching transients produced by said switching relay coil.

29. The circuit according to claim 27, further comprising an overvoltage protection circuit, including:

a non-linear device connected between said input line conductor and said input neutral conductor, said non-linear device conducting only in response to an overvoltage condition; and a silicon controlled rectifier responsive to said non-linear device to remove the drive current from the Darlington pair when said non-linear device is conducting, thereby causing said normal polarity sensing circuit not to activate said normal polarity switch circuit during an overvoltage condition, such that said input line conductor is not connected to said output line conductor, and said input neutral conductor is not connected to said output neutral conductor.

30. The circuit according to claim 29, wherein:

said non-linear device is a PNPN diode;

said overvoltage protection circuit further includes a first resistor and a second resistor connected in series with said PNPN diode between said input line conductor and said input neutral conductor; and an anode of said silicon controlled rectifier is connected to a base of the first transistor, a cathode of said silicon controlled rectifier is connected to said input line conductor, and a control gate of said silicon controlled rectifier is connected between said first and second resistors.

31. The circuit according to claim 23, further comprising a short-circuit conductor connected between said output neutral conductor and said ground conductor and forming a permanent short-circuit between said output neutral conductor and said ground conductor.

32. The circuit according to claim 31, further comprising:

an overload protection stage adapted to protect the load from overload conditions;

a diverter stage adapted to suppress transient overvoltages;

a normal mode filtering stage adapted to suppress normal mode electromagnetic interference; and a clamping stage adapted to suppress residual voltage transients.

33. The circuit according to claim 23, further comprising:

an overload protection stage adapted to protect the load from overload conditions;

a diverter stage adapted to suppress transient overvoltages;

a normal mode filtering stage adapted to suppress normal mode electromagnetic interference; and a clamping stage adapted to suppress residual voltage transients.

34. The circuit according to claim 23, wherein said reverse polarity switch circuit is not activated by said reverse polarity sensing circuit, said input line conductor is not connected to said output neutral conductor, and said input neutral conductor is not connected to said output line conductor when said reverse polarity sensing circuit detects that any of the line, neutral and ground connectors of the supply system is disconnected or an AC voltage is present across the line and ground connectors of the supply system.

35. The circuit according to claim 23, wherein said reverse polarity switch circuit comprises a double pole, single throw switching relay having a switching relay coil, a first switch element connectable between said input line conductor and said output neutral conductor and a second switch element connectable between said input neutral conductor and said output line conductor.

36. The circuit according to claim 23, further comprising a short-circuit conductor connected between said output neutral conductor and said ground conductor and forming a permanent short-circuit between said output neutral conductor and said ground conductor.

*37. A circuit for sensing an overvoltage condition between a line conductor and a neutral conductor connectable to a supply system, comprising:*

*an overvoltage protection circuit coupled to the line and neutral conductors that generates an overvoltage signal having a first state indicating an overvoltage condition in which an rms voltage between the line and neutral conductors exceeds a predetermined level, and a second state indicating an non-overvoltage condition between the line and neutral conductors; and*

*a wiring fault condition sensing circuit coupled to said overvoltage protection circuit, to the line and neutral conductors and to a ground conductor, the wiring fault condition sensing circuit including a switching device for selectively supplying a drive current to produce a switch control signal in response to a state of the overvoltage signal and to the supply system being correctly wired and connected to the line, neutral and ground conductors, wherein the switching device receives the overvoltage signal from said overvoltage protection circuit such that the switching device is inhibited from supplying the drive current in response to the overvoltage signal indicating an overvoltage condition, and operation of the switching device is unaffected by the overvoltage signal indicating a non-overvoltage condition.*

*38. The circuit of claim 37, wherein said switching device is a Darlington pair.*

*39. The circuit of claim 37, further comprising a switch configured to couple the line conductor to a load in response to the switch control signal.*

*40. A circuit for sensing an overvoltage condition between a line conductor and a neutral conductor connectable to a supply system, comprising:*

*an overvoltage protection circuit coupled to the line and neutral conductors and configured to generate an overvoltage signal having a first state indicating a non-overvoltage condition between the line and neutral conductors and a second state indicating an overvoltage condition between the line and neutral conductors, wherein the overvoltage protection circuit comprises: a switch control circuit coupled to the line and neutral conductors and configured to generate an overvoltage switch control signal in response to a voltage between*

*the line and neutral conductors; and a switching element coupled to the switch control circuit and configured to generate the overvoltage signal in response to the overvoltage switch control signal; and*

*a wiring fault condition sensing circuit coupled to the overvoltage protection circuit, to the line and neutral conductors and to a ground conductor, said wiring fault condition sensing circuit generating a switch control signal in response to the supply system being correctly wired and connected to the line, neutral and ground conductors and a state of the overvoltage signal, wherein said switch control circuit comprises: a non-linear device, a first resistor and a second resistor connected in series between the line and neutral conductors, wherein the non-linear device conducts only in response to an overvoltage condition between the line and neutral conductors, and wherein the overvoltage switch control signal is generated at a junction between the first and second resistors.*

*41. The circuit of claim 40, wherein said non-linear device is PNPN diode.*

*42. The circuit of claim 40, wherein said switching element is a silicon controlled rectifier, an anode of said silicon controlled rectifier is connected to said wiring fault condition sensing circuit, a cathode of said silicon controlled rectifier is connected to the line conductor, and a control gate of said silicon controlled rectifier is connected to the junction between said first and second resistors.*

* * * * *